US009563857B2

United States Patent
Chien et al.

(10) Patent No.: US 9,563,857 B2
(45) Date of Patent: Feb. 7, 2017

(54) MULTI-OBJECTIVE SEMICONDUCTOR PRODUCT CAPACITY PLANNING SYSTEM AND METHOD THEREOF

(71) Applicant: National Tsing Hua University, Hsinchu (TW)

(72) Inventors: Chen-Fu Chien, Hsinchu (TW); Jei-Zheng Wu, Hsinchu (TW); Jia-Nian Zheng, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 250 days.

(21) Appl. No.: 14/170,881

(22) Filed: Feb. 3, 2014

(65) Prior Publication Data

US 2015/0074025 A1 Mar. 12, 2015

(30) Foreign Application Priority Data

Sep. 11, 2013 (TW) .............................. 102132865 A

(51) Int. Cl.
*G06Q 10/00* (2012.01)
*G06N 3/12* (2006.01)

(52) U.S. Cl.
CPC .............. *G06Q 10/00* (2013.01); *G06N 3/126* (2013.01)

(58) Field of Classification Search
CPC ........ G06Q 10/00; G06Q 10/06; G06Q 50/04; G06N 3/126; G06N 99/00; G06N 99/005
(Continued)

(56) References Cited

U.S. PATENT DOCUMENTS 6,233,493 B1 * 5/2001 Cherneff ................ G06Q 10/06
700/103
2003/0050902 A1 * 3/2003 Buczak .................. G06N 3/126
706/13
(Continued)

OTHER PUBLICATIONS

Wu J. et al., "Coordinating Strategic Outsourcing Decisions for Semiconductor Assembly Using a Bi-objective Genetic Algorithm", International Journal of Production Research, Jan. 2012.*
(Continued)

*Primary Examiner* — Dave Misir
(74) *Attorney, Agent, or Firm* — Muncy, Geissler, Olds & Lowe, P.C.

(57) ABSTRACT

Disclosure is a multi-objective semiconductor product capacity planning system and method thereof. The system comprises a data input module, a capacity planning module and a computing module. The machine information of the production stations, the product information and the order information are input by the data input module. According to the demand quantity of order, capacity information and product information, the capacity planning module plans a capacity allocation to determine the satisfied quantity of orders. The capacity allocation information is used to form a gene combination by chromosome encoding method. The computing module calculates the gene combination several times to generate numerous candidate solutions by a multi-objective genetic algorithm. The numerous candidate solutions sorts out and generates a new gene combination, and repeats the calculation to form candidate solution set until stop condition is satisfied. The candidate solution set is transformed into numerous suggestive plans as options.

8 Claims, 3 Drawing Sheets

(58) Field of Classification Search
USPC .......................................................... 706/13
See application file for complete search history.

(56) References Cited

U.S. PATENT DOCUMENTS

| | | | | |
|---|---|---|---|---|
| 2004/0249743 | A1* | 12/2004 | Virginas | G06Q 10/06 705/37 |
| 2010/0185480 | A1* | 7/2010 | Wang | G06Q 10/063 705/7.11 |
| 2014/0019186 | A1* | 1/2014 | Li | G06Q 10/0631 705/7.22 |

OTHER PUBLICATIONS

Wu J. et al., "A novel bi-vector encoding genetic algorithm for the simultaneous multiple resources scheduling problem", Journal of Intell. Manuf., 2012, 23, pp. 2255-2270.*

Chien C. et al., "A Novel Multi-Objective Genetic Algorithm for Product-Mix Planning and Revenue Management for Semiconductor Fabrication Foundry Service", Asia Pacific Industrial Engineering and Management System, Dec. 2013 (Date precludes use).*

Frutos M. et al., "Comparison of Multiobjective Evolutionary Algorithms for Operations Scheduling under Machine Availability Constraints", Hindawi Publishing Corporation, The ScientificWorld Journal, vol. 2013, Article ID 418396, 9 pages, Dec. 30, 2013 (Date precludes use).*

Kazancioglu E. et al., "Multi-Period Production Capacity Planning for Integrated Product and Production System Design", Proceeding of the 2006 IEEE International Conference on Automation Science and Engineering, Shanghai, China, Oct. 7-10, 2006.*

Kazancioglu E. et al., "Multi-Period Robust Capacity Planning Based on Product and Process Simulations", Proceedings of the 2004 Winter Simulation Conference, 2004.*

Altiparmak F. et al., "A genetic algorithm approach for multi-objective optimization of supply chain networks", Computers & Industrial Engineering, 51, 2006, pp. 196-215.*

Hu G. et al., "Hybrid Case-Based Reasoning for Capacity Planning in Semiconductor Manufacturing", International Conference on Information Science and Technology, Mar. 26-28, 2011, Nanjing, Jiangsu, China.*

* cited by examiner

MULTI-OBJECTIVE SEMICONDUCTOR PRODUCT CAPACITY PLANNING SYSTEM AND METHOD THEREOF

CROSS-REFERENCE TO RELATED APPLICATION

This application claims the benefit of Taiwan Patent Application No. 102132865, filed on Sep. 11, 2013, in the Taiwan Intellectual Property Office, the disclosure of which is incorporated herein its entirety by reference.

BACKGROUND OF THE INVENTION

1. Field of the Invention

The present invention generally relates to a semiconductor product capacity planning system and method thereof, in particular with respect to a multi-objective semiconductor product capacity planning system and method thereof obtained under evaluation criteria of multi planning objectives.

2. Description of the Related Art

In accordance with the regular procedure of semiconductor company, the sales may determined the demand quantity of order based on the product category, and then the production control department arranged the purchasing material into production plan and satisfied it with the capacity limit. The manufacture department produced the amount of finished products according to the production schedule than delivered to the customer. However, if some details in the process go wrong, the departments have to coordinate with each other to make up for the mistake and therefore wastes time and money. Besides, the outcome is often disappointed. Because each department only concerns about their own objectives and the final result usually cannot contribute to the company.

Presently, when planning a production schedule, the personnel can only provide a capacity planning alternatives for the demand quantity offered by the sales department along with capacity amount comes from the manufacturing department. The decision-maker is usually lacking in relevant statistics while have to do something about the planning alternatives. If decision-makers can consider the relating financial index before planning, they can get the optimal goal for the company.

As a result, a multi-objective semiconductor product capacity planning system and method thereof of the present invention is provided to generate planning alternatives for different capacity arrangements by means of multi limits to the object, and thus the decision-maker can choose the optimal capacity planning alternatives.

SUMMARY OF THE INVENTION

In view of the above technical problem, one of the goals of the present invention is to provide a multi-objective semiconductor product capacity planning system and method thereof to overcome the obstacle to a decision-maker who cannot choose the capacity planning scheme based on different object that derives from the prior art.

According to a goal of the present invention, a multi-objective semiconductor product capacity planning system is provided, which comprises a data input module, a capacity planning module and a computing module. Machine information, product information and order information are input by the data input module. The machine information defines a plurality of product stations and a capacity limit of the plurality of product stations, the product information defines a plurality of product categories and a production cost of the plurality of product categories, and the order information defines a demand quantity of order for a plurality of customer orders and a product price. The capacity planning module receives input data from the data input module and coordinates the demand quantity of order with the machine information and the product information to plan a satisfied number of order to satisfy the capacity limit. The satisfied number of order is determined by a capacity allocation proportion of order to decide a capacity utilization rate of each of the orders and a satisfied priority of order to arrange a production sequence of each of the orders. A resource allocation combines the capacity allocation proportion of order and the satisfied priority of order and transforms into a gene combination by a chromosome encoding method. The computing module receives the gene combination from the capacity planning module and calculates the gene combination several times to generate a plurality of new candidate solutions by using a multi-objective genetic algorithm. The plurality of new candidate solutions sorts by using a plurality of planning objectives as evaluation criteria to generate a new gene combination, and repeats the calculation to form a candidate solution set until a stop condition is satisfied. The candidate solution set transforms into a plurality of suggestive plans and one of the plurality of suggestive plans is selected to arrange the production stations for manufacturing the product categories.

Preferably, wherein, the plurality of planning objectives of the computing module comprise a financial index related to an revenue, a profit or a gross margin, or a production index related to a production quantity or a capacity utilization.

Preferably, wherein, the plurality of planning objectives are a income maximization, a profit maximization and a gross profit ratio maximization.

Preferably, the computing module sorts and generates the new gene combination by a Pareto front method.

Preferably, the multi-objective semiconductor product capacity planning system further comprises a report module for presenting the plurality of suggestive plans.

According to a goal of the present invention, a multi-objective semiconductor product capacity planning method is provided, which is applicable to a multi-objective semiconductor product capacity planning system comprising a data input module, a capacity planning module and a computing module, the method comprises following steps: receiving machine information from a production machine of each production stations, and product information and order information by the data input module; planning a satisfied number of order by the capacity planning module, deciding a capacity utilization rate of each of the orders as a capacity allocation proportion of order and arranging a production sequence of each of the orders as a satisfied priority of order, combining the capacity allocation proportion of order and the satisfied priority of order as a resource allocation to form a gene combination by a chromosome encoding method; using a multi-objective genetic algorithm for the evolution of the gene combination for generating a plurality of new candidate solutions by the computing module; using a plurality of planning objectives as the evaluation criteria to sort the plurality of new candidate solutions for generating a new gene combination by the computing module; repeating the calculation to form a candidate solution set by the computing module until a stop condition is satisfied; transforming the candidate solution set into a plurality of suggestive plans and selecting one of the plurality of suggestive plans to arrange the production stations for manufacturing a product.

Preferably, the multi-objective semiconductor product capacity planning method further comprises following step: using a revenue, a profit, a gross margin, a production quantity or a capacity utilization as an index of the plurality of planning objectives.

Preferably, the multi-objective semiconductor product capacity planning method further comprises following step: serving a revenue maximization, a profit maximization and a gross margin maximization as the plurality of planning objectives through the planning module.

Preferably, the multi-objective semiconductor product capacity planning method further comprises following step: sorting by Pareto Front method and generating the new gene combination.

Preferably, the multi-objective semiconductor product capacity planning method further comprises following step: presenting the plurality of suggestive plans by using a report module.

To sum up, in accordance with a multi-objective semiconductor product capacity planning system and method thereof of the present invention, there are one or more advantages as follows:

(1) The multi-objective semiconductor product capacity planning system and method thereof may provide the decision-maker to choose a preferable scheme according to the capacity allocation schemes planned by multi object limits along with diversity compared with different decision index.

(2) The multi-objective semiconductor product capacity planning system and method thereof may provide reference to short-term remaining capacity application and long-term production plan according to the chosen capacity allocation scheme.

(3) The multi-objective semiconductor product capacity planning system and method thereof may provide the capacity allocation scheme of the whole financial performance of the company comprising revenue, profit or gross margin.

DETAILED DESCRIPTION OF THE PREFERRED EMBODIMENTS

Figure 1:
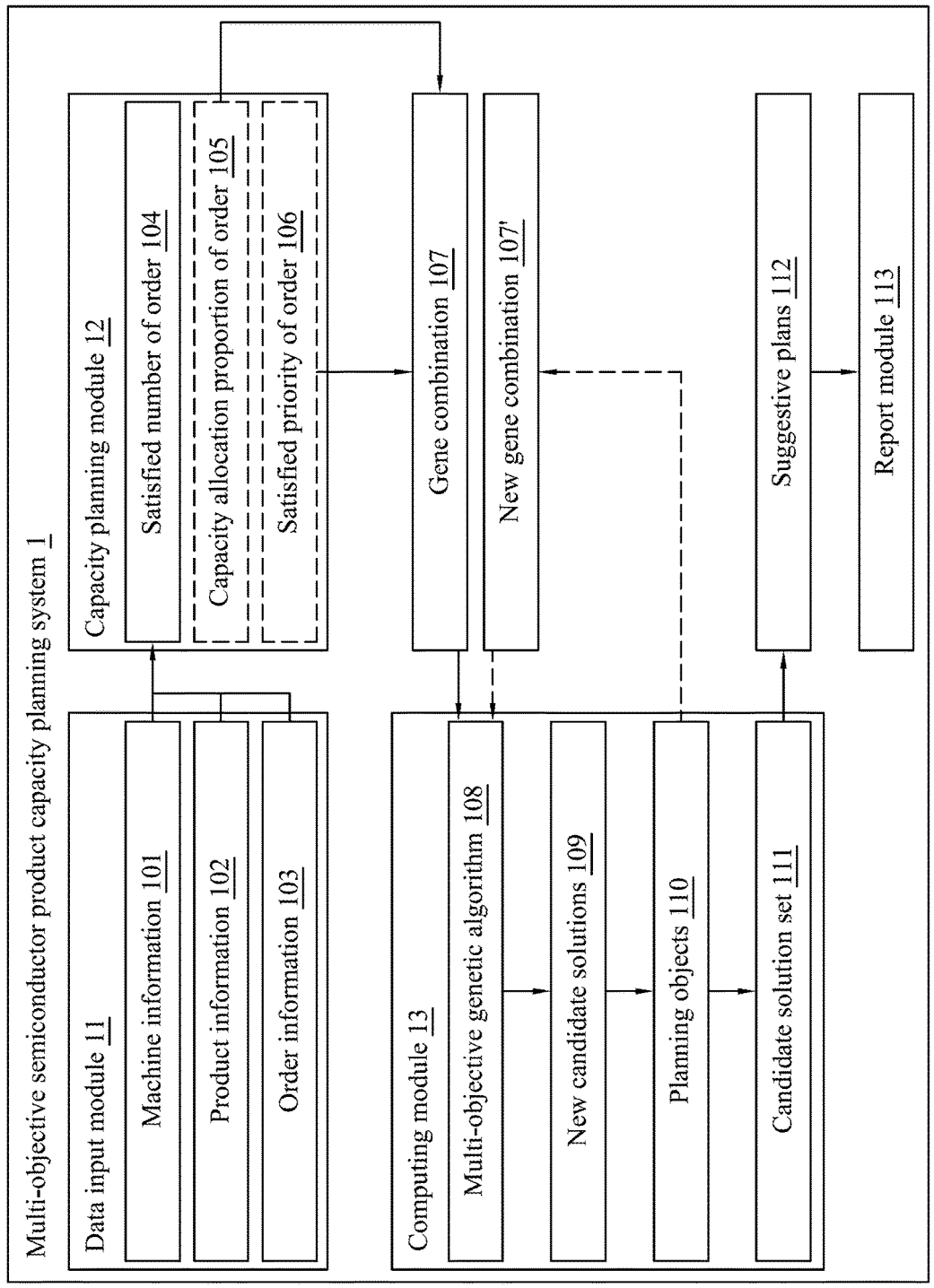
FIG. 1 is a block diagram of a multi-objective semiconductor product capacity planning system in accordance with the present invention.

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In accordance with the embodiment(s) of the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

With reference to FIG. 1 for a block diagram of a multi-objective semiconductor product capacity planning system in accordance with the present invention. As can be seen in the figure, a multi-objective semiconductor product capacity planning system 1 comprises a data input module 11, a capacity planning module 12 and a computing module 13. The data input module 11 is used to receive an inputted machine information 101, a product information 102 and an order information 103, wherein the machine information 101 comprises a plurality of product stations and a generable capacity limit thereof; the product information 102 includes a plurality of product categories and a production cost thereof; the order information 103 includes a demand quantity of order for a plurality of customer orders and a product price; a capacity planning module 12 is used to plan a satisfied number of order 104 of customer order, under a limit to satisfy with an upper limit of capacity, based on the machine information 101, the product information 102 and the order information 103 in the data input module 11; the satisfied number of order 104 is determined by a resource allocation having a capacity allocation proportion of order 105 and a satisfied priority of order 106, and the capacity allocation proportion of order 105 determines the satisfied number of order 104 based on the proportion distributed by the capacity of each order, and in order to avoid exceeding in the capacity limit, the satisfied number of order 104 combines the capacity allocation proportion of order 105 and the satisfied priority of order 106 as a gene combination 107 by a chromosome encoding method, and proceeds to conduct following calculation based on the gene combination 107; the computing module 13 calculates the gene combination 107 by a multi-objective genetic algorithm 108, and after several times of calculation, generating a plurality of new candidate solutions 109, the plurality of new candidate solutions 109 comprise numerous resource allocations obtained from the arranging various planning objects 110 to sort and generate a new gene combination 107', the new gene combination 107' repeats the calculation until a stop condition is satisfied by the multi-objective genetic algorithm 108, for example, when reached to a limited operation time or the candidate solution can be improved anymore, than generating a candidate solution set 111, and the candidate solution set 111 can be transformed into several suggestive plans 112. However, the suggestive plans 112 are not the best solution which matches all the planning objects 110, they belong to the alternatives of the various planning objects 110. The decision-maker is able to survey the above-mentioned several practical suggestive plans 112 based on the report module 113 to choose the suggestive plans 112 in accordance with the business strategy of company or operation direction thereof.

Figure 2:
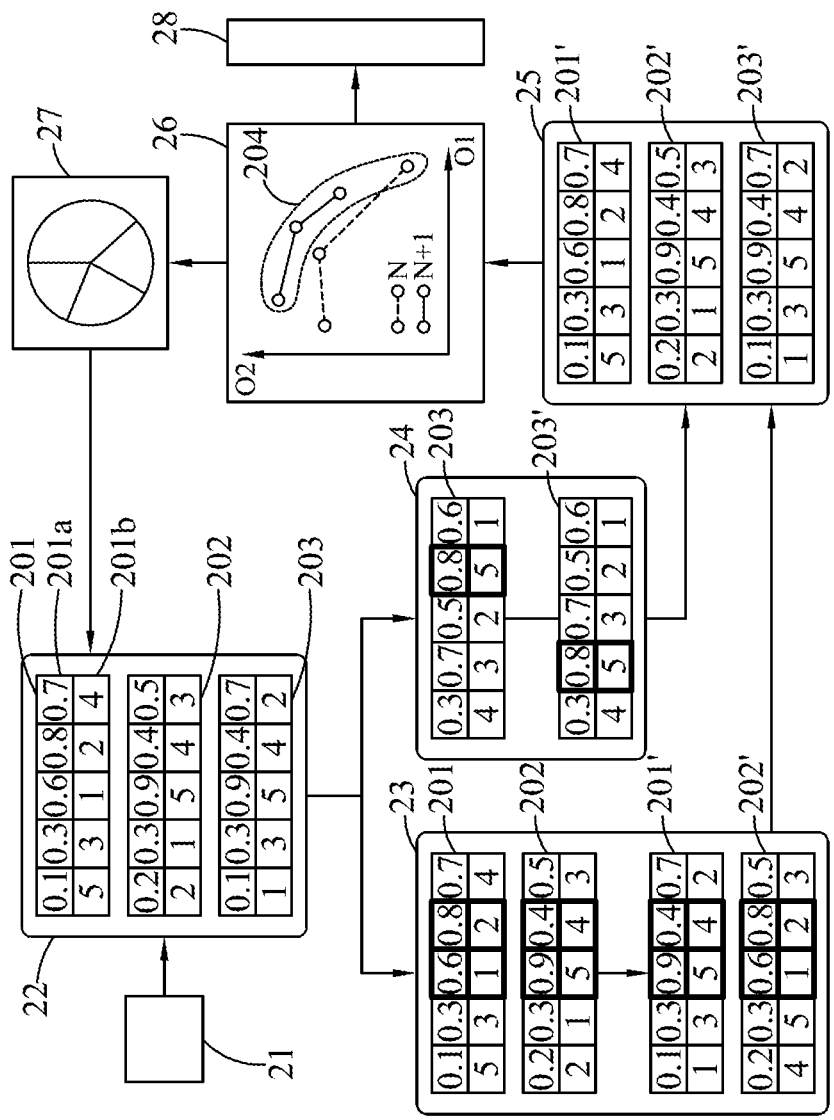
FIG. 2 is a schematic view of a multi-objective semiconductor product capacity planning system in accordance with the present invention.

With reference to FIG. 2 for a schematic view of a multi-objective semiconductor product capacity planning system in accordance with the present invention. As can be seen in the figure., the computing module generates a desirable capacity allocation plan 21 by the information of the data input module and the capacity planning module, wherein, the capacity allocation plan 21 includes that plans the capacity allocation of production station s after received an order i, and takes the satisfied number of the order for the current capacity as the main point of planning, and the plan for the satisfied number of order i is as following:

$$q_i = L_i + (U_i - L_i) \times z_i, \forall i$$

Wherein, $q_i$ is a satisfied number of order i, $L_i$ is a minimum commitment number of order i, $U_i$ is a maximum demand number of order i, $z_i$ is a capacity allocation proportion of order i. The above plan still has to satisfy with the capacity condition as following:

$$\sum_i q_i \times A_{is} \leq CA_s, \forall s,$$

Wherein, $A_{is}$ is a unit capacity consumption in station s of order i; $CA_s$ is a capacity number in station s; that is, the number of each site s cannot exceed in an upper limit to the capacity in the site.

According to the aforementioned plan and limit, the satisfied number of order i $q_i$ is determined by the capacity allocation proportion of order i $z_i$; and thus, by a multi-objective genetic algorithm to transform into a way of gene to seek for a solution. As can be shown in FIG. 2, a first parent chromosome 201 generated by coding method based on the capacity allocation plan 21, the length of the chromosome means an order quantity; consequently, the first parent chromosome 201 includes 5 order quantities, in addition, the gene of each chromosome indicates different order information, and the first parent chromosome 201 can be divided into two parts, the first part 201*a* means the capacity allocation proportion of order i $z_i$, $z_1$ is a real number in a range of 0 to 1, and by planning a capacity distributive proportion of different orders, can calculate the satisfied number of order, and the second part 201*b* is a satisfied priority of order, when calculating the satisfied number of order, by adjusting the satisfied priority of order can avoid the planning production quantity exceeding in an upper limit of capacity; similarly, a second parent chromosome 202 and a third parent chromosome 203 can be generated by coding method, and the three chromosomes are served as an initiation parent 22 for planning calculation.

When the parent chromosomes 201, 202 and 203 in the initiation parent 22 are established, by a crossover method and a mutation method of multi-objective genetic algorithm to respectively evaluate and generate a child chromosome; and as can be shown in FIG. 2, the crossover evaluation 23 uses PMX crossover method or two-point crossover method to randomly select two parent chromosomes 201, 202, and generates a crossover interval in which at random, the gene code in the crossover interval generates an initiation child chromosome to correct the corresponding relationship of the gene code along with the unreasonable gene code, the child chromosome 201', 202' are therefore generated. The mutating evaluation 24 is to select for a parent chromosome 203, and randomly chooses a gene code as an insertion point to insert into the gene code, a new child chromosome 203' is thus generated. Copying the child chromosomes 201', 202' and 203' generated by the two kinds of evaluations to form the candidate solution and proceed to evaluate and decode 25, and in accordance with the satisfied number of order planned by different order of the candidate solution to calculate the entire revenue, profit and gross margin, and the three indexes are regarded as the evaluation standard. The algorithm is as follows:

$$MaxO_1 = \sum_i P_i \times q_i$$

$$MaxO_2 = \sum_i (P_i - C_i) \times q_i$$

$$MaxO_3 = O_2 / O_1$$

Wherein, $O_1$ is revenue; $O_2$ is profit; $O_3$ is gross margin; $P_i$ is unit price of order i, $q_i$ is satisfied number of order i, $C_i$ is unit price of order i.

Using a multi-objective genetic algorithm may cause a great deal of child candidate solutions, so, according to the above indexes of revenue, profit and gross margin along with Paretol Front method as a sorting procedure 26 to sort out the candidate solutions; as shown in the figure, the means is to transform the satisfied number of order planned by the candidate solutions into revenue, profit and gross margin, and demonstrate by the candidate solution of generation N and N+1, and to sequence by non-dominated sorting; the means helps the decision-maker to find the importance of the objects among the plans; as a result, the pareto front 204 found in candidate plans by the non-dominated solution arranges the combination which cannot dominate with each other in the same rank and maintains the candidate solution located in the front edge in the diagram as well as sorts out the candidate solution of worse index. After sorted out, the child chromosome and the original parent chromosome are used to generate a new parent chromosome by roulette wheel selection 27 as well to generate new candidate solution; determining whether the candidate solution is a better one by the Pareto Front method and the evaluation process will not stop till the biggest generation is satisfied. Finally, gathering the candidate solution sorted out by the Pareto Front method as the suggestive plan 28.

Figure 3:
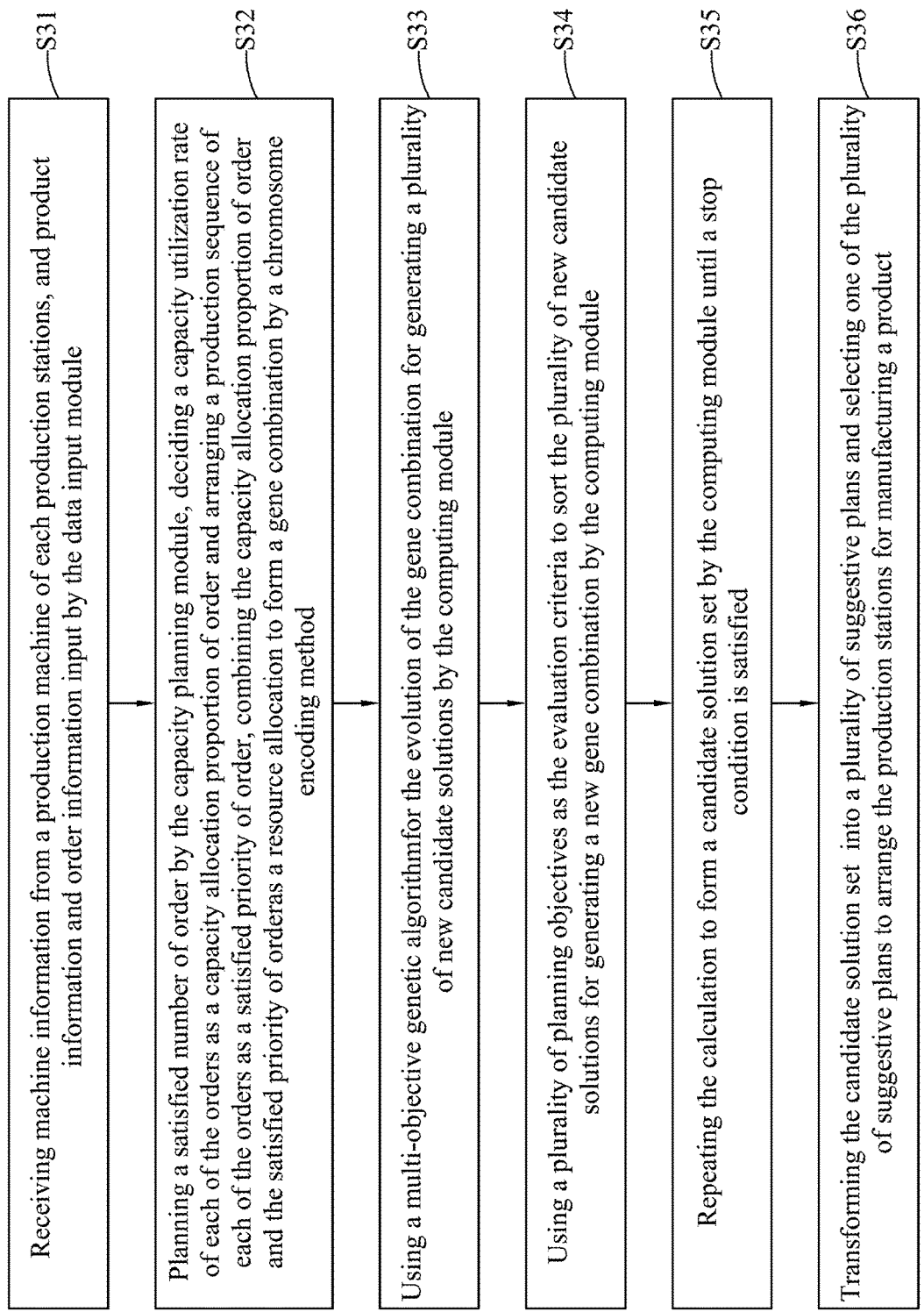
FIG. 3 is a flow chart of a multi-objective semiconductor product capacity planning method in accordance with a first embodiment of the present invention.

With reference to FIG. 3 a flow chart of a multi-objective semiconductor product capacity planning method in accordance with a first embodiment of the present invention. The multi-objective semiconductor product capacity planning method is applicable to the aforementioned multi-objective semiconductor product capacity planning system, wherein, steps of the method are as follows:

Step 31: Receiving a machine information from a production machine of each production stations, and a product information and an order information input by the data input module.

Step 32: Planning a satisfied number of an order by a capacity planning module, and forming a resource allocation having a capacity allocation proportion of order and a satisfied priority of order as a gene combination by a chromosome encoding method.

Step 33: Using a multi-objective genetic algorithm for the evolution of the gene combination for generating a plurality of new candidate solutions by the computing module.

Step 34: Using a plurality of planning objectives as the evaluation criteria to sort the plurality of new candidate solutions for generating a new gene combination by the computing module.

Step 35: Repeating the calculation to form a candidate solution set by the computing module until a stop condition is satisfied.

Step 36: Transforming the candidate solution set into a plurality of suggestive plans and selecting one of the plurality of suggestive plans to arrange the production stations for manufacturing a product.

The above steps are that after inputted the machine, product information and order information of the data input module, the capacity planning module and the computing module calculate several suggestive plans, wherein the planning objective may include the financial index related to revenue, profit or gross margin, or the production index related to a production quantity and a capacity utilization; if the maximum values of revenue, profit or gross margin are served as the planning direction, the system may plan to generate several plans, and to report the result of the several plans by a report module. The report can be shown in following list 1.

| List 1: | | | |
| --- | --- | --- | --- |
| Unexecuted planning system | Revenue | profit | Gross margin |
| January Number of Plans | $38,262,307 | $7,285,424 | 18.80 |
| 1 | $39,294,540 | $6,693,861 | 17.04 |
| 40 | $39,282,493 | $6,696,030 | 17.05 |
| 68 | $39,010,656 | $6,974,232 | 17.88 |
| 236 | $39,010,491 | $6,974,281 | 17.88 |
| 209 | $39,008,402 | $6,975,254 | 17.88 |
| 51 | $38,973,618 | $7,044,777 | 18.08 |
| 3 | $38,956,266 | $7,180,907 | 18.43 |
| 4 | $38,864,545 | $7,443,733 | 19.15 |
| 5* | $38,849,086 | $7,461,556 | 19.21 |
| 6 | $38,846,440 | $7,461,657 | 19.21 |
| 7 | $37,070,830 | $7,140,509 | 19.26 |
| 8 | $36,663,363 | $7,266,520 | 19.82 |

As can be seen from the report that the relationship between revenue, profit and gross margin is not positive and comparing which with the result of unexecuted planning system, if only seeking for revenue, it may reduce the gross profit rate and deteriorate the improved result, consequently, the decision-maker is supposed to emphasize the business strategy to make appropriate decision upon the influence caused by different objectives, take plan of number 5 as example, the consideration of the decision-maker depends on that revenue, profit and gross margin are all better than the result of unexecuted planning system, and the improvement thereof is more equal, so that can be regarded as the chosen plan. The report can further examine the content of the plan which the allocation of capacity plan violates the special limitation, for example, the designated machine or the priority customer and so on is supposed to be adjusted according to the condition thereof. After the company practically executed the multi-objective semiconductor product capacity planning system and method thereof, the statistics of the improved proportion of the revenue, profit and gross margin in each month within the half year can be shown in list 2, and from the list, after the multi-objective semiconductor product capacity planning system and method thereof executed, it has 1% improvement in the revenue, profit and gross margin in each month. As a result, the multi-objective semiconductor product capacity planning system and method thereof indeed promotes the efficiency of running the business of company.

| List 2: | | | | |
| --- | --- | --- | --- | --- |
| Month | Revenue % | Profit % | Gross margin % | Total % |
| 1 | 1.53% | 2.42% | 2.18% | 6.13% |
| 2 | 0.37% | 0.33% | 1.28% | 1.98% |
| 3 | 1.62% | 0.37% | 1.87% | 3.86% |
| 4 | 1.81% | 0.45% | 0.19% | 2.45% |
| 5 | 0.54% | 1.77% | 1.52% | 3.83% |
| 6 | 1.43% | 1.64% | 0.93% | 4.00% |
| Average | 1.22% | 1.16% | 1.33% | 3.71% |

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A multi-objective semiconductor product capacity planning system, comprising:
a memory device; and
a processor coupled to the memory device, the processor configured to execute a plurality of modules stored in the memory device, and the plurality of modules comprising:
a data input module, accepting inputs of machine information, product information and order information, the machine information defining a plurality of production stations and a capacity limit of the plurality of production stations, the product information defining a plurality of product categories and a production cost of the plurality of product categories, the order information defining a demand quantity of order for a plurality of customer orders and a product price;
a capacity planning module, receiving input data from the data input module, coordinating the demand quantity of order with the machine information and the product information to plan a satisfied number of order to satisfy the capacity limit, determining the satisfied number of order by a capacity allocation proportion of order to decide a capacity utilization rate of each of the orders and a satisfied priority of order to arrange a production sequence of each of the orders, combining the capacity allocation proportion of order and the satisfied priority of order as a resource allocation and transforming the resource allocation into a gene combination by a chromosome encoding method; and
a computing module, receiving the gene combination from the capacity planning module, calculating the gene combination several times to generate a plurality of new candidate solutions by using a multi-objective genetic algorithm, sorting the plurality of new candidate solutions by using a plurality of planning objectives as evaluation criteria to generate a new gene combination, and repeating the calculation to form a candidate solution set until a stop condition is satisfied, transforming the candidate solution set into a plurality of suggestive plans and selecting one of the plurality of suggestive plans to arrange the production stations for manufacturing the product categories;

wherein the gene combination comprises two parts of a parent chromosome, which are respectively represented as the capacity allocation proportion of order and the satisfied priority of order, wherein when the parent chromosome generates a child chromosome, a corresponding relationship of a gene code of the parent chromosome is corrected;

wherein the plurality of planning objectives are a revenue maximization, a profit maximization and a gross margin maximization.

2. The multi-objective semiconductor product capacity planning system of claim 1, wherein, the plurality of planning objectives of the computing module comprise a financial index related to a revenue, a profit or a gross margin, or a production index related to a production quantity or a capacity utilization.

3. The multi-objective semiconductor product capacity planning system of claim 1, wherein, the computing module sorts out and generates the new gene combination by a Pareto front method.

4. The multi-objective semiconductor product capacity planning system of claim 1, further comprising a report module for presenting the plurality of suggestive plans.

5. A multi-objective semiconductor product capacity planning method, applicable to a multi-objective semiconductor product capacity planning system comprising a data input module, a capacity planning module and a computing module, the method comprising:

receiving machine information from a production machine, and product information and order information input by the data input module;

planning a satisfied number of order by the capacity planning module, deciding a capacity utilization rate of each of the orders as a capacity allocation proportion of order and arranging a production sequence of each of the orders as a satisfied priority of order, combining the capacity allocation proportion of order and the satisfied priority of order as a resource allocation to form a gene combination by a chromosome encoding method, wherein the gene combination comprises two parts of a parent chromosome, which are respectively represented as the capacity allocation proportion of order and the satisfied priority of order;

using a multi-objective genetic algorithm for the evolution of the gene combination for generating a plurality of new candidate solutions by the computing module, wherein when the parent chromosome generates a child chromosome, a corresponding relationship of a gene code of the parent chromosome is corrected;

using a plurality of planning objectives as the evaluation criteria to sort the plurality of new candidate solutions for generating a new gene combination by the computing module;

serving a revenue maximization, a profit maximization and a gross margin maximization as the plurality of planning objectives through the computing module;

repeating the calculation to form a candidate solution set by the computing module until a stop condition is satisfied; and transforming the candidate solution set into a plurality of suggestive plans and selecting one of the plurality of suggestive plans to arrange the production stations for manufacturing a product.

6. The method of claim 5, further comprising the following step:

using a revenue, a profit, a gross margin, a production quantity or a capacity utilization as an index of the plurality of planning objectives.

7. The method of claim 5, further comprising the following step:

sorting the plurality of new candidate solutions by a Pareto front method and generating the new gene combination.

8. The method of claim 5, further comprising the following step:

presenting the plurality of suggestive plans by using a report module.

* * * * *